Dec. 23, 1930.  W. ROBINSON  1,785,788
DECOY DUCK
Filed Dec. 11, 1928
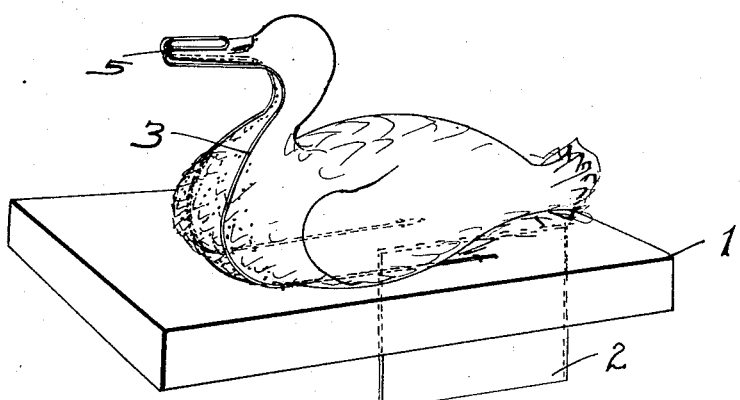
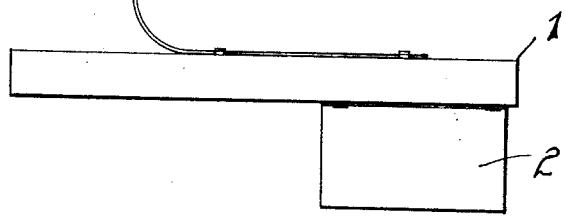
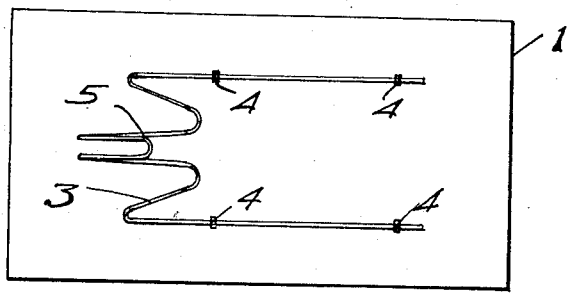
Inventor
Wilfred Robinson
By Carlos P. Griffin
Attorney Patented Dec. 23, 1930

1,785,788

UNITED STATES PATENT OFFICE

WILFRED ROBINSON, OF DRAWBRIDGE, CALIFORNIA

DECOY DUCK

Application filed December 11, 1928. Serial No. 325,291.

This invention relates to a decoy for hunting ducks, and geese or other birds where a floating decoy is usable.

It will be understood to those who have hunted ducks and geese that it is difficult to produce decoys sufficiently life like to induce birds to land near them and many times the hunter will use the dead birds as decoys with a long sharp stick to hold them in place. Such decoys are not life like however, as the bill and head cannot be made to assume the proper position with respect to the neck and body.

The present invention provides a float on which the bird is placed and there is a spring support for the head to hold it in the most life like position possible, and, of course, the hunter then uses a bird of the same character as the ones he is shooting.

Other objects of the invention will be apparent as the description proceeds.

An embodiment of the invention is shown in the accompanying drawing in which the same reference numeral is applied to the same portion throughout the several figures of the drawing and of which there may be modifications.

Figure 1 is a perspective view of the decoy float showing a duck placed thereon in dotted lines, Figure 2 is a side elevation of the decoy float, Figure 3 is a plan view of the float.

The float consists of a small flat block of wood or cork 1 which has a flat lead plate secured underneath the same to act as a keel at 2, whereby the float is held flat in windy weather.

The bird is held in a natural life-like position by placing its feet on the top of the float with the head and neck supported by the curved wire 3. This wire is made of spring steel and has several staples 4 to secure it to the float, while the middle portion of the wire is bent forward and then backward to form a clamp over the top of the bird's bill as shown at 5, to hold the head up properly.

In use any kind of birds may be used on the decoy.

Having thus described my invention, what I desire to secure by Letters Patent of the United States is as follows, but modifications may be made in carrying out the invention as shown in the drawings and in the above particularly described form thereof, within the purview of the annexed claims:

1. A decoy support comprising a float, a single piece of wire bent to provide a two wire support for the breast, neck, and bill of a decoy bird, and means to secure the wire on said float.

2. A decoy of the class described, comprising a float, a wire support for a dead duck in a life-like position on said float, said wire being secured to said float and curving outwardly to support the breast of the bird, and curving inwardly to support the neck thereof, and curving outwardly and back to support the bill.

3. A decoy of the class described, comprising a float, a wire bent double and then bent to conform to the shape of the bill, the neck and breast of a bird and having spaced supporting members secured on said float.

In testimony whereof I have hereunto set my hand this 4th day of December, A. D. 1928.

WILFRED ROBINSON.